United States Patent
Jostmeyer et al.

(10) Patent No.: US 8,806,500 B2
(45) Date of Patent: Aug. 12, 2014

(54) DYNAMICALLY SETTING THE AUTOMATION BEHAVIOR OF RESOURCES

(75) Inventors: Bernd Jostmeyer, Boeblingen (DE);
Norbert Lenz, Boeblingen (DE);
Markus Mueller, Boeblingen (DE);
Martin Reitz, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 12/481,557

(22) Filed: Jun. 9, 2009

(65) Prior Publication Data

US 2009/0307706 A1    Dec. 10, 2009

(30) Foreign Application Priority Data

Jun. 10, 2008 (EP) .................................. 08157964.1

(51) Int. Cl.
*G06F 9/46* (2006.01)
(52) U.S. Cl.
USPC .......................................................... 718/104
(58) Field of Classification Search
None
See application file for complete search history.

(56) References Cited

U.S. PATENT DOCUMENTS

| 4,627,018 | A  | * | 12/1986 | Trost et al. ..................... 711/149 |
| 7,065,620 | B2 | * | 6/2006  | Ballard et al. ................ 711/162 |
| 7,321,992 | B1 |   | 1/2008  | Vellore et al. |
| 7,412,479 | B2 |   | 8/2008  | Arendt et al. |
| 2003/0079154 | A1 | * | 4/2003 | Park et al. ......................... 714/1 |
| 2008/0126793 | A1 |   | 5/2008 | Jostmeyer et al. |
| 2009/0276657 | A1 | * | 11/2009 | Wetmore et al. ................. 714/4 |

OTHER PUBLICATIONS

Engelmann et al., Concepts for High Availability in Scientific High-End Computing, Laboratory Directed Research and Development Program—Oak Ridge National Lab (7 pgs).
Engelmann et al., Symmetric Active/Active High Availability for High-Performance Computing System Services, Journal of Computers, vol. 1, No. 8, Dec. 2006 (12 pgs).

* cited by examiner

*Primary Examiner* — Mengyao Zhe
(74) *Attorney, Agent, or Firm* — Toler Law Group, PC (57) ABSTRACT

Embodiments provide a method of dynamically setting the automation behavior of resources via switching between an active mode and a passive mode. One embodiment is a method that includes placing a first computing resource into a first desired state and an active behavioral mode and placing a second computing resource having a relationship to the first resource into the first desired state when a first request for the first resource that specifies the first desired state is received. The method also includes placing the first computing resource into a standby state and a passive behavioral mode and not placing the second computing resource into the first desired state.

17 Claims, 7 Drawing Sheets

DYNAMICALLY SETTING THE AUTOMATION BEHAVIOR OF RESOURCES

CROSS REFERENCE TO RELATED APPLICATIONS

This application claims priority of European Patent Application No. 08157964.1, filed Jun. 10, 2008.

BACKGROUND

The present invention relates to dynamically setting the automation behavior of a resource via a policy-based automation engine.

Within enterprise computing centers dedicated to supporting an Information Technology (IT) infrastructure, human operators may be employed to keep diverse applications up and running. In order to achieve high levels of availability, software programs—typically called "automation software"—may be used to support the operators. Automation software refers to software that automates operator tasks for the purpose of keeping applications highly available.

Automation software often handles scenarios in which an application and Information Technology (IT) resources may need to be stopped, moved or restarted either in planned scenarios for maintenance purposes or unplanned scenarios when failures occur.

BRIEF SUMMARY

Embodiments provide a method of dynamically setting the automation behavior of resources by switching between an active mode and a passive mode. In one embodiment, a method includes receiving, at a policy based automation engine, a first request that specifies a first desired state of a first computing resource of a plurality of computing resources. The first computing resource having a standby state and having a passive behavioral mode. The method also includes placing the first computing resource into the first desired state and placing the first computing resource into an active behavioral mode. The method further comprises placing a second computing resource of the plurality of resources into the first desired state.

In a particular embodiment, a system includes memory to store information concerning states and modes of resources in a computing system and to store automation computer code. The system includes a processor to place a first resource into a first state. When the first state is either an online state or an offline state, the processor assigns an active mode to the first resource and places a second resource having a relationship to the first resource into the first state. This enables the first resource and the second resource to share a common automation goal. The processor also assigns a passive mode to the first resource. When the first state is a standby state, the processor does not place the second resource into the first state.

In another particular embodiment, a computer readable storage medium includes instructions that, when executed by a processor, cause the processor to place a first resource into a desired state. The computer readable storage medium also includes instructions that cause the processor to place the first resource in an active mode when the first resource is in a desired state of online or offline. When the first resource is placed in the active mode, a second resource having a relationship to the first resource is placed into the desired state. When the first resource is in a standby state, the processor places the first resource in a passive mode. When the first resource is in the passive mode, the processor does not place the second resource into the desired state.

DETAILED DESCRIPTION

An end-to-end automation manager may manage various computing resources in a network of computing resources. The types of resources may include resource references, resource groups and choice groups. A resource reference may be a virtual resource that references actual resources such as databases. The actual resources may be hosted by first level automation clusters. Each resource may belong to a cluster of resources. Resource groups may be composed of members that share the same automation goal and may be managed as one unit. Group members can be resource references, choice groups or other resource groups, thereby allowing an arbitrary level of nested groups.

End-to-end automation may be request driven or event driven. In request driven automation, the automation manager may know the automation goal, i.e., the request, for each resource the automation manager manages. Automation goals may be called requests. There may be multiple competing and possibly conflicting requests for a single resource. Each request has a priority and the request with the highest priority may determine the "desired state" of the resource. Possible desired state values for a resource may include "online" and "offline." The end-to-end automation manager may pursue the request with the highest priority by trying to keep the resource associated with the highest priority request in a desired state. In contrast to request-driven system automation, in command-driven system automation, the last command issued for a resource determines the desired state.

In event-driven automation, an automation engine subscribes to events of the managed resources. The managed resources inform the subscribers of any status change. A new automation cycle may be triggered either by events being received and/or requests being submitted or removed. Event-driven system automation has the advantage that a permanent reevaluation may not be required, thereby saving valuable computational resources.

The automation manager may be aware of relationships between resources that may be defined in the end-to-end automation policy. Relationships are constraints on the automation behavior of a resource. Examples of relationships are 'Reference', 'HasMember', 'HasAlternative', 'StartAfter', 'StopAfter' and 'ForcedDownBy.' The automation manager respects relationships as part of the policy, so relationships influence the automation behavior. For example, when a resource has a desired state of "online" that has a StartAfter relationship to another resource, the latter resource may be started first before the former resource is started. When a resource has a desired state of "offline" that has a StopAfter relationship to another resource, the former resource is stopped after the latter resource.

The automation manager may pursue the desired state of resource references not by issuing start or stop commands, but by submitting requests for the referenced resources managed by the first level automation manager. This ensures that a resource is only started or stopped when the first level automation manager has determined that any relationships defined for the resource in the first level automation policy may be fulfilled and no higher priority requests exist.

To ensure that each resource is kept in the resource's desired state, the automation manager keeps track of various states for each resource. One possible state of a resource is the "desired state." The desired state is the automation goal that the automation manager pursues. Possible desired states include online and offline. When the desired state is online, the automation manager tries to keep the resource online. When the desired state is offline, the automation manager tries to keep the resource offline. An "observed state" of a resource describes the current state of the actual first level automation resource as reported by the first level automation manager. When the observed state is online, the resource is running. When the observed state is offline, the resource is stopped. A "compound state" of a resource indicates whether the resource or resource group works as desired or whether problems have occurred. For example, the system may provide an indicator informing operators when they need to react to a situation. An "operational state" of a resource provides additional information about the compound state.

End-to-end automation choice groups have the following characteristics: the members of a choice group may be configuration alternatives that provide the same functionality. For example, two databases can be provided where one is used as a production database and the other one serves as a backup. In a choice group, only one of the members may be online at a time. The members can be resource references, resource groups, or choice groups. One member of the choice group may be defined as a "preferred member." When the desired state of the choice group is online, the automation manager may keep the preferred member online, while keeping the other members offline.

Figure 1:
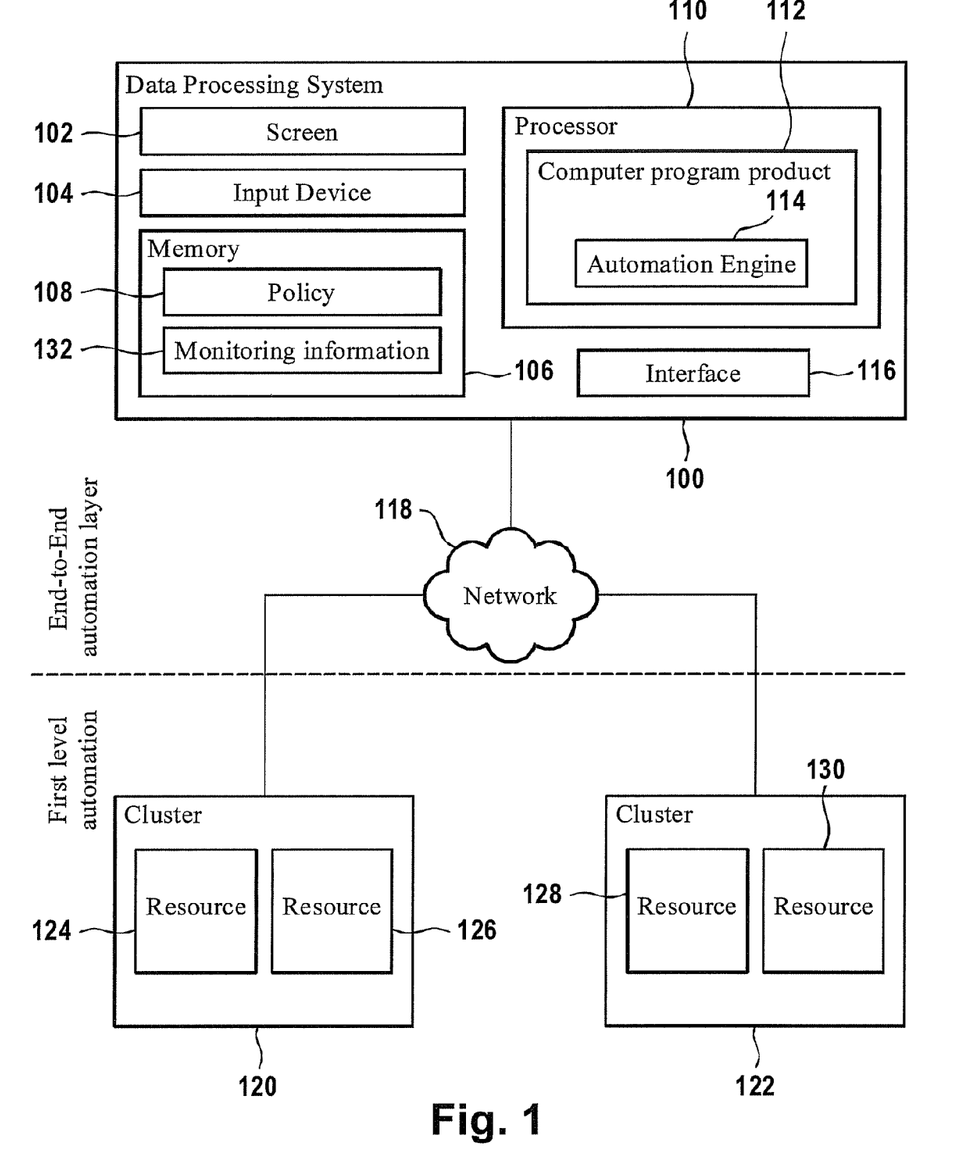
FIG. 1 is a block diagram of an illustrative embodiment of an automation system.

FIG. 1 is a block diagram of an illustrative embodiment of an automation system including a data processing system 100 and two first-level automation clusters 120 and 122. In a particular embodiment, the data processing system 100 may either be part of the cluster 120 or part of the cluster 122, or the data processing system 100 might be a stand alone data processing system. The data processing system 100 may communicate with the clusters 120 and 122 by means of a network 118, such as an intranet or the Internet. The communication may be performed by means of the interface 116. This may require special adapters that allow for a communication of the clusters 120 and 122 with the interface 116. These adapters can be regarded as a part of the data processing system 100.

The data processing system 100 includes the computer screen 102 and the input device 104, such as a mouse and a keyboard. The data processing system 100 includes a memory 106 which includes an automation policy. An automation policy is an abstract configuration description of an application and the IT resources to run the application. The memory further includes monitoring information 132 about the first-level automation resources 124, 126, 128, 130 that may be managed by the data processing system 100.

Further, the data processing system 100 includes a processor 110 which may be adapted to execute computer executable instructions included in a computer program product 112. The computer program product 112 includes an end-to-end automation engine 114.

In a particular embodiment, the resource 124 may be a database and the resource 126 may be a computer system adapted to access the database 124. The system architecture depicted in FIG. 1 may be in a banking environment where the cluster 120 serves as the "working cluster", and the cluster 122 serves as a "backup cluster." For this purpose, the cluster 122 includes a resource 128 and a resource 130, wherein the resource 128 and the resource 130 have interdependencies with the resources 124 and 126, respectively. The resource 128 may be a database that is a one-for-one copy of the database resource 124. This requires continuous data mirroring between the storage devices that may be accessed by the resource 124 and the resource 128. Similarly, the resources 126 and 130 may be redundant applications.

In a particular embodiment, the cluster 120 may need to be shut down for maintenance purposes. In order to ensure availability, the data processing system 100 may need to takeover the workload from the first cluster 120 and transfer the workload to the second cluster 122. The policy 108 may define how the workload may be allocated among the resources 124, 126, 128 and 130 together with additional automation constraints such as relationships. In a script-based system, a script mechanism might be used to transition from a configuration that uses the cluster 120 to another configuration that uses the cluster 122. However, such configuration switches may be complex and may need testing each time a configuration changes.

In operation, the automation behavior of a first resource may be set by the policy-based automation engine 114 and in a request driven system automation is provided. The first resource 124 may include a relationship to a second resource 126. The desired state of a resource may be determined by a winning request of a set of requests. The winning request may be the request with the highest priority. The desired state determines the behavioral mode of the resource 124. The behavioral mode describes how requests may be propagated along relationships to resources and how the observed state and the compound state are computed. At least one request may be placed on the first resource 124. The desired state of the first resource 124 may be determined by the requested action specified in the winning request. The first resource 124 may be set to an active mode, indicating a request is submitted for a second resource. When no request is placed on the first resource 124, the desired state of the first resource 124 may be set to standby, indicating the absence of any request on the first resource 124.

Further, when no request is placed on the first resource 124, the first resource 124 may be placed in passive mode, indicating and ensuring that no action is taken on requests placed on the second resource 126. When at least one request is placed on the first resource 124, a winning request may be determined from a set of competing requests placed on the first resource 124. The desired state of the first resource 124 may be set according to the winning request, and the first resource 124 may be set in active mode. Alternatively, when no request is placed on the first resource 124, the desired state of the first resource 124 may be set to standby and the first resource 124 may be set to passive mode.

Figure 2:
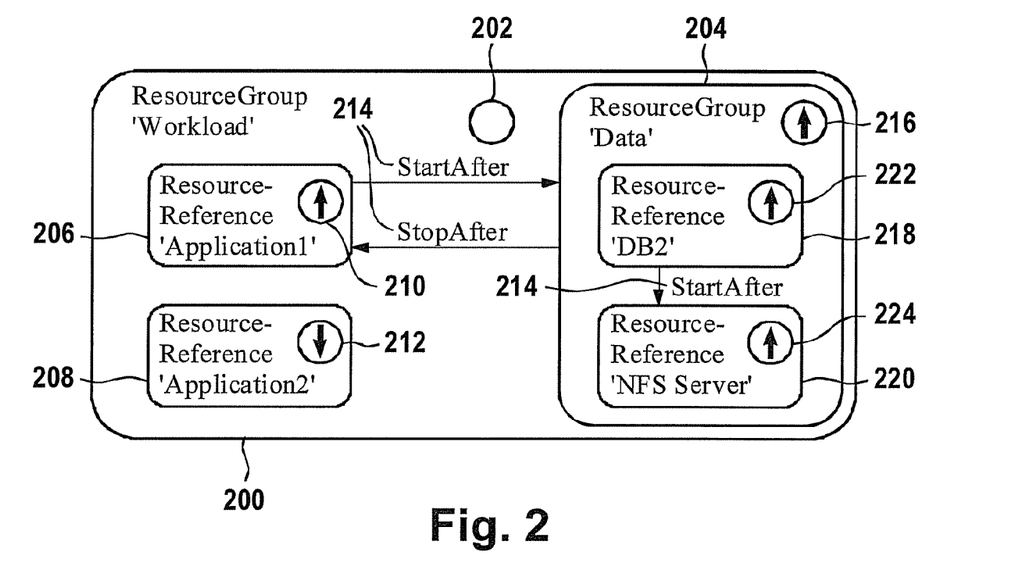
FIG. 2 is a block diagram of an illustrative embodiment of nested groups with an outer group in passive mode.
Figure 3:
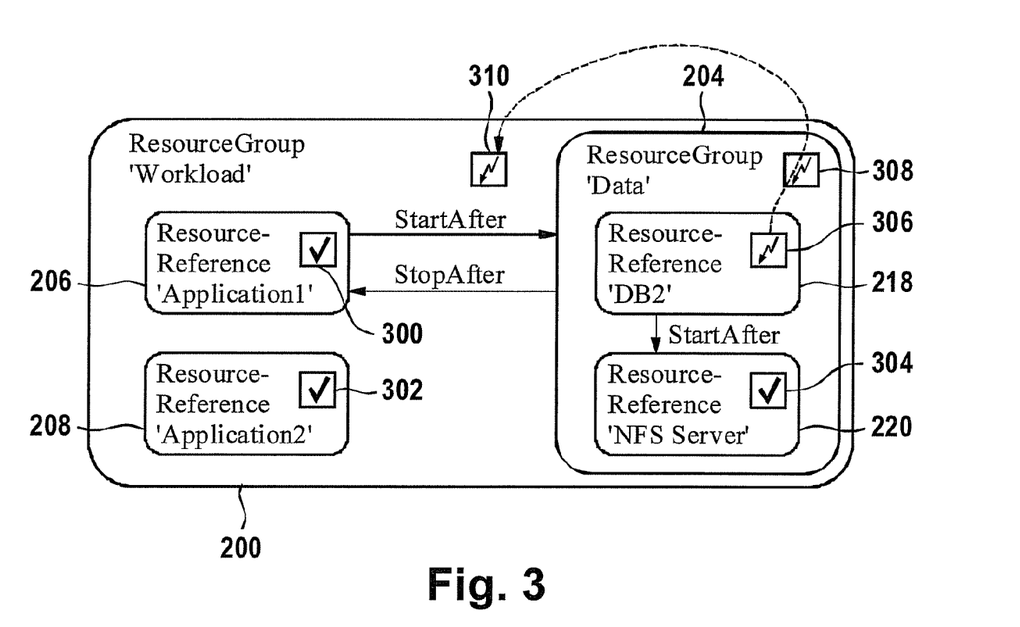
FIG. 3 is a block diagram of an illustrative embodiment of nested groups with an observed state of one of the nested groups indicating an error.
Figure 4:
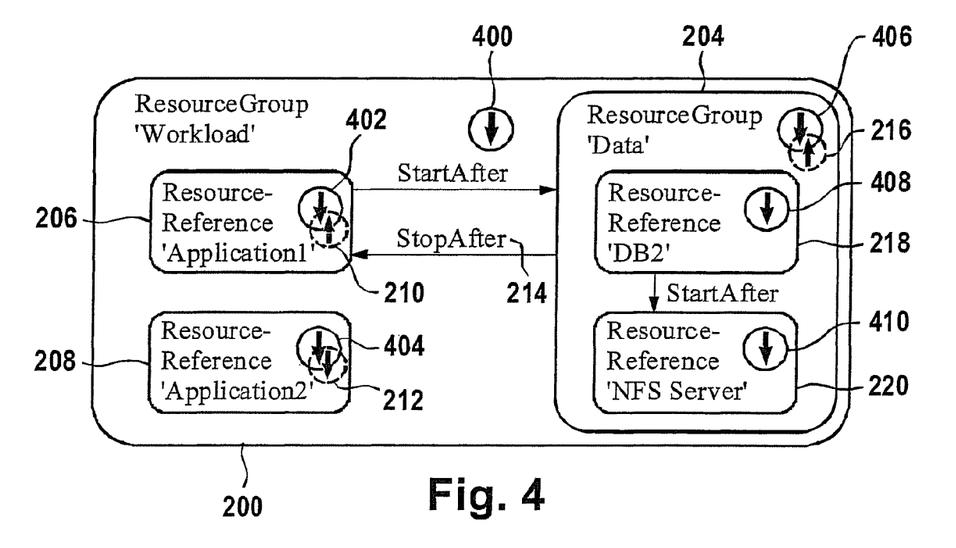
FIG. 4 is a block diagram of an illustrative embodiment of nested groups with an outer group in active mode.

In a particular embodiment, an additional desired state may be provided so that the desired state is no longer binary, i.e. online or offline, but ternary, i.e. online, offline or standby. The desired state "standby" results from the absence of any requests on a resource. When a resource has a desired state of standby, the resource has no automation goal. However, there may still be requests placed on the individual members of a group that is in passive mode. The new desired state, standby, can occur on any type of resource, including a resource reference, a resource group and a choice group. By establishing an extra desired state of "standby" and establishing passive and active behavioral modes, the configuration of automated resources can be changed dynamically without having to stop managed resources. FIGS. 2-4 illustrate the use of active mode and passive mode to transfer a workload from one cluster to another.

FIG. 2 is a block diagram of an illustrative embodiment of nested groups with an outer group in passive mode. FIG. 2 shows the initial setup of a first resource which is a resource group 'Workload' 200. This resource group includes relationships to a further resource group 'Data' 204 and resource references 'Application1' 206 and 'Application2' 208. The resource group 'Data' 204 further includes resource references 'DB2' 218 and 'NFS Server' 220. The resource reference 'Application1' 206 and the resource group 'Data' 204 depend on each other by means of relationships 214. For example, the start after relationship 214 that interconnects the resource reference 'Application1' 206 and the resource group 'Data' 204 indicates that the resource reference 'Application1' 206 may be started only after the resource group 'Data' 204 has been started.

FIG. 2 shows that requests may be placed on each member of the group 200. The upward pointing arrow within a circle denotes an online request, and a downward pointing arrow within a circle denotes an offline request. Thus, an online request 210 may be placed on the resource reference 'Application1' 206, and an offline request 212 may be placed on the resource reference 'Application2' 208. Further, an online request may be placed on the resource references 'DB2' 218 and 'NFS Server' 220 indicated by the requests 222 and 224, respectively. The online request placed on 'DB2' 218 and 'NFS' server 220 are the result of placing an online request 216 on the resource group 'Data' 204.

The group 'Workload' 200 is a group that is in passive mode when no request is placed on the group. The passive mode may be a result of the absence of any request on the group, indicated by the empty circle 202. Because there is no request placed on the group 'Workload' 200, the desired state of the group is standby and the behavioral mode is passive. As a consequence, the observed state of the group 'Workload' 200 is 'not applicable' since the members 206, 208 and 204 may be partially in the observed state offline and partially in the observed state online. None of the observed state values, starting or stopping, describe this situation, because there is no direction intended in the desired state.

Not shown in FIG. 2 is the compound state of the group 200 and the individual group members. However, the individual group members' compound state is assumed in FIG. 2 to be OK such that the compound state of the group 'Workload' 200, which corresponds to the worst compound state of the members included in the group, is also OK.

In operation, the desired state determines the behavioral mode of a resource, such as resource reference 'Application1' 206. The behavioral mode of a resource can be either active mode or passive mode. The behavioral mode of a resource can switch between active and passive mode dynamically at run time. When the desired state of a first resource, such as resource reference 'Application1' 206, is online or offline, the resource may be in active mode, and requests may be passed to downstream resources, such as resource group 'Data' 204. When the desired state of a resource is standby, the resource may be in passive mode, and no requests may be passed to downstream resources. Downstream resources refer to resources that are associated with the resource and that are potentially affected by the desired state of the resource.

The dynamic switching between active mode and passive mode may be performed during reevaluation as part of an automation cycle. In event-driven automation, the automation engine subscribes to events of the managed resources. The managed resources may inform the subscribers of any status change. Thus, a new automation cycle may be triggered either by events being received and/or requests being submitted or removed. Event-driven system automation has the advantage that a permanent reevaluation is not required, thereby saving valuable computational resources.

The ability to switch the behavioral mode of a resource, such as resource reference 'NFS Server' 220, dynamically at runtime is an advantage compared to the possibility of specifying the behavior of a group in a policy. For example, when the behavior of a group is specified in a policy, the behavior is static at runtime and cannot be easily switched to active behavior. In a policy based system, changing a policy requires deactivating the policy, stopping all managed resources, and activating the modified policy. Thus, one advantage of dynamic switching of the behavioral mode of a resource is that managed resources do not have to be stopped to switch the behavioral mode.

Resources 204, 206, and 208 managed by system automation products can be suspended from automation. Suspension from automation may be performed by means of freezing the automation for a resource. Requests which are placed on a suspended resource are not removed, so that automation behavior is still influenced. A suspension may be actively and explicitly performed by an operator. There may be no possibility of placing a request on a resource that is suspended from automation until operation of the resource is resumed.

In contrast to suspended resources, requests can be placed on resources which are in passive mode, i.e. which have a desired state of standby. A request submitted to a resource in passive mode causes the resource to switch to active mode. Other than for resources in a suspended state, submitting requests for resources that are in passive mode is not disabled and there is no additional operation required to submit and resume a request in order to switch the behavioral mode of a resource.

FIG. 3 is a block diagram of an illustrative embodiment of nested groups with an observed state of one of the nested groups indicating an error. FIG. 3 illustrates the same nested set of groups as described with respect to FIG. 2. In FIG. 3, compound states 300-310 of the individual groups and group members are illustrated. FIG. 3 depicts a scenario in which the compound states of the resource reference 'Application1' 206 is OK (300) and wherein the compound state of the resource reference 'Application2' 208 is also OK (302). However, an error has occurred on resource reference 'DB2' 218.

The algorithm to compute the compound state of resources that are in active mode may be the same for all resource types. The algorithm compares the observed state with the desired state and determines a state based on the values of each resource. When the values of the observed state and the desired state match, then the compound state may be set to OK. When the values of the observed state and the desired state differ and the observed state indicates that the resource is in a transient automation state (starting or stopping), the compound state may be set to warning. When the values differ and the observed state indicates that the resource is not in a transient automation state, (offline), the compound state may be set to error. When the values differ and the observed state indicates that the resource is in a non recoverable error, the compound state may be set to fatal. In the example, the observed state of resource reference 'DB' 218 may be offline, thus the compound state may be set to error (306). Nevertheless, the compound state of the resource reference 'NFS Server' 220 is still OK (304).

When a desired state of a group is starting and not all members of a group are in an observed state of online, the group may be in an observed state of "starting," because automation tries to achieve the desired state online. The same is true for a desired state of offline and observed state stopping. When the desired state of a group is standby, the group is neither starting nor stopping. Therefore, the observed states of starting and stopping do not make sense in conjunction with the desired state standby. The observed state may be set to a newly introduced value "not applicable."

When groups are evaluated, the observed state may be computed before the compound state, because the compound state of resources in active mode may be computed on the basis of the observed state. When the observed state of resource reference 'DB2' is offline, the observed state of the resource group 'Data' 204 may be set to starting. Thus, the compound state warning may be computed and set for the group being in active mode (308).

The algorithms for computation of the observed state and the compound state of the resource group 'Workload' 200 differ from those for resource group 'Data' 204, because the former is in passive mode having a desired state of standby, while the latter is in active mode having a desired state of online. The observed state of the resource group 'Workload' 200 may be set to "not applicable." Because the resource group is in passive mode, the compound state may not be computed on the basis of the observed state, but rather on the basis of the compound states of the members. By determining the worst compound state from the members' compound states OK (300), OK (302) and warning (308), the compound state may be set to warning (310).

As a consequence, the automation system or an operator may decide to perform a certain action in order to counteract the problem associated with the resource reference 'DB2' 218. For example, the operator may have done some investigation and detected a serious outage as the beginning of a rolling disaster. The operator may decide to perform a site takeover, which means that the workload may be entirely shifted away from the site to a backup site. In other words, the warning or error indicated by the compound state 310 may trigger a site takeover by a disaster recovery manager. This may be required to ensure a continuous operation of a banking environment at a backup site when the groups depicted in FIGS. 2, 3 and 4 belong to a banking environment.

In a site takeover, the business critical workload at the primary site should be stopped. This means that a subset of the resources being managed by the system automation has the temporary and common automation goal of being offline.

With this temporary and common automation goal, a conflict may be resolved between the online requests that were previously submitted for the resources 'Application1' 206 (210) and 'Data' 204 (222), and the goal may be to stop the business critical workload at this site. The conflict may be resolved by temporarily overriding the individual automation goals of the members 206, 208 and 204 (and thus 218 and 220) by a higher prioritized offline request. In turn, at another computing site respective backup resources which are backups of the resources 206, 208, 204, 218 and 220 may be set to online mode in order to ensure a continued operation of the automation system.

In operation, where a relationship indicates that, independent of the desired state and behavioral mode of a first resource 206, no request is to be propagated from the first resource 206 to a second resource 204, the automation engine does not submit a request for the second resource 204. Where the relationship indicates that, independent of the desired state and mode of the first resource 206, a request is propagated from the first resource 206 to the second resource 204, the automation engine submits this request for the second resource 204, wherein the first resource 206 may be entered as part of the request information of the request being submitted. Where the relationship indicates that, depending on the desired state and mode of the first resource 206, the winning request may be propagated from the first resource 206 to the second resource 204, when the desired state of the first resource 206 is not standby and the first resource 206 is in active mode, the automation engine submits a copy of the winning request for the second resource 204. Where the relationship indicates that, dependent on the desired state and mode of the first resource 206, the winning request may be propagated from the first resource 206 to the second resource 204, when the desired state of the first resource 206 is standby and the first resource 206 is in passive mode, the automation engine does not submit a request for the second resource 204 and removes any request previously submitted by the automation engine along the relationship for the second resource 204.

There are three ways that relationships can cause the automation engine to submit requests for associated resources: first, a relationship may unconditionally not affect the set of requests (for example StopAfter which only inhibits a stopping of the source resource); second, a relationship may cause the automation engine to statically submit the same request for an associated resource (for example HasAlternative where the alternatives of a choice group are always suppressed); or third, a relationship may cause the automation engine to submit a request for the associated resource whose nature may be dependent on the winning request or the desired state (for example HasMember or Reference). The ternary desired state model and the dynamically changeable behavioral mode provide a third method of request propagation. The model enables a system administrator to dynamically turn request propagation on or off for certain relationship types. This can be used, for example, to implement groups that can dynamically change their behavior between actively influencing their members and only monitoring their members.

A relationship may indicate that a second resource 204 is a group and a third resource is a member, where the second resource 204 further includes at least one further relationship to a further group member 218. In this embodiment, when the desired state of the second resource 204 is standby and the second resource 204 is in passive mode, the observed state is computed without a context of the desired state and the compound state is computed exclusively on the basis of the compound states of all members. When the desired state of the second resource 204 is not standby and the second resource 204 is in active mode, the embodiment includes computing the observed state in a context of the desired state and computing the compound state exclusively on the basis of the states of the first resource 204.

Using different methods for determining the observed state and the compound state of groups based on the desired state has several advantages. For example, performance may be increased, because the members may be consulted for computation only when necessary. Meaningful values may be provided even when a semantic label of the desired state changes to standby.

Figure 6:
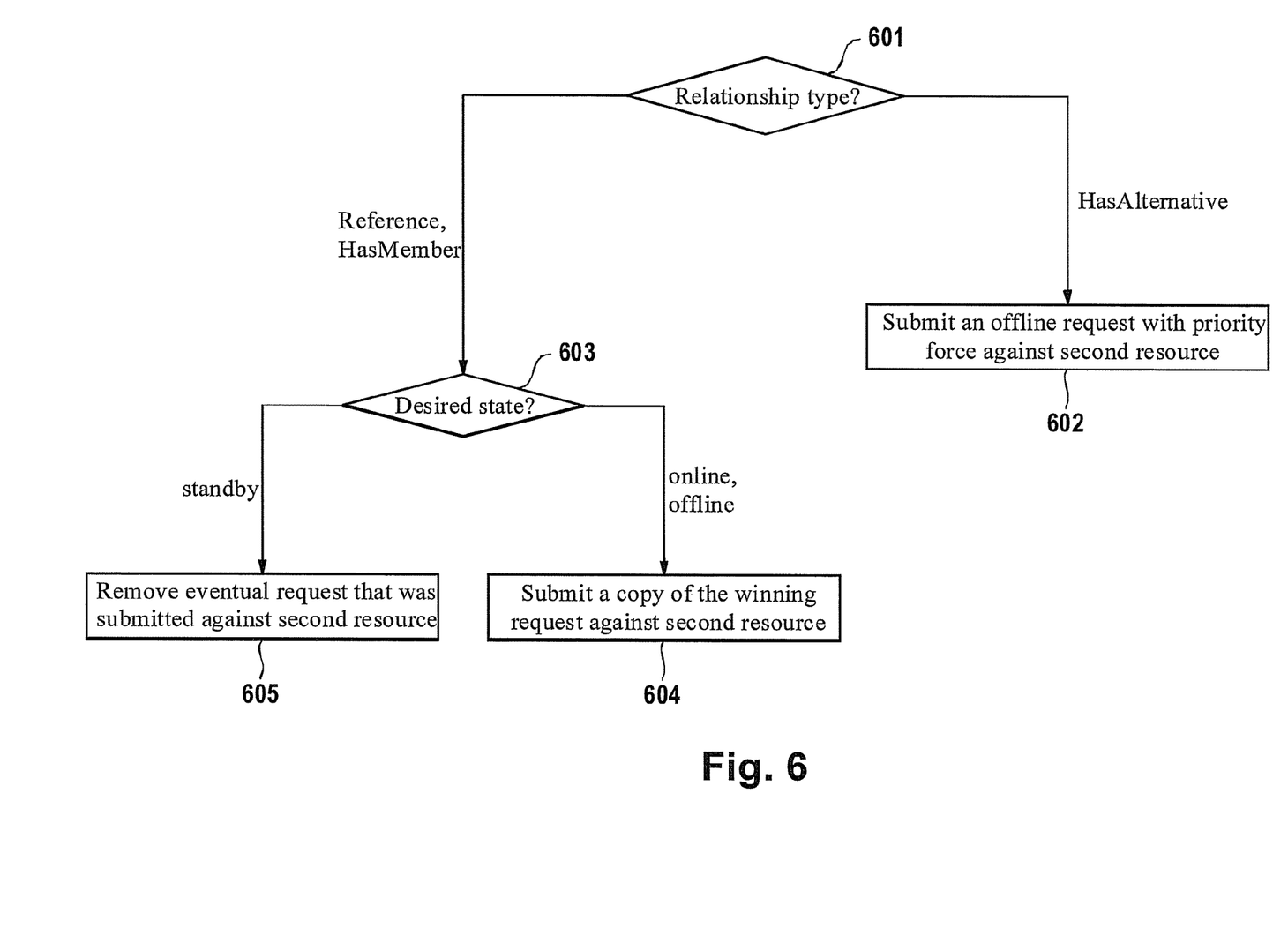
FIG. 6 is a flow chart of an illustrative embodiment of determining an action performed on a downstream resource to establish a desired state of the downstream resource in a request or goal-based system automation engine.

FIG. 4 is a block diagram of an illustrative embodiment of nested groups with an outer group being active. Instead of using lengthy, slow and error prone scripts to perform a site takeover, the group 'Workload' 200 can be set into active mode in order to trigger the site takeover. This is depicted in FIG. 4. In FIG. 4, an offline request 400 is placed onto the group 'Workload' 200. The offline request has a higher priority than the requests which are already placed on the individual members. As a consequence of the request, the desired state of the first resource 200 may be set to offline and the behavioral mode may be set to active. Thus, the first resource 200 tries to achieve the desired state by submitting appropriate requests to the members of the first resource. An algorithm may be used which is depicted in FIG. 6 and described below. The outcome of this algorithm is that the high priority offline request 400 is copied and submitted to each of the members. At the resource reference 'Application1' 206, this has the consequence that the originally present online request indicated by the request 210 is overridden with the high priority offline request 402. The reason for overriding the original online request 210 is that at the resource reference 206 a winning request is determined from the requests 402 and 210. Since the offline request 402 is a high priority request, in this case the winning request will be the offline request 402.

The same principle holds for the resource reference 'Application2' 208 which had an original request 212 of online. The high priority request offline 404 overrides the original desired request online 212 of the resource reference 'Application2' 208. The observed state 216 of the resource group 'Data' 204 was originally set to 'online'. However, the offline request 406 may be submitted from the group 'Workload' to the resource group 'Data'. It may be assumed that the offline request 406 has higher priority, thus overriding the previously placed online request on the resource group 'Data'. As a consequence, the desired state of the resource group 'Data' may be set to offline.

Further, the offline request 406 may be further propagated to the resource reference 'DB2' 218 and the resource reference 'NFS Server' 220. The automation engine submits the high priority offline request to both members of resource group 'Data' 204. The requests 222 and 224, which were submitted to the members in the previous automation cycle, may be exchanged with the newly submitted requests 408 and 410, because a request source can submit at most one request to a resource.

When placing online or offline requests in the active mode, relationships and group dependencies may still be considered. In other words, by placing the offline requests 402 onto the resource reference 'Application1' 206 and the offline request 406 onto the resource group 'Data' 204, the relationship 'StopAfter' is still obeyed for shutting down the members 204 and 206.

To change the automation behavior of the group 200 to passive mode to resume the business critical workload contained in the group 'Workload' 200 as depicted in FIG. 2, the request 400 needs to be removed from the group 'Workload' 200. By removing the request 400, the desired state of the group 200 may be set to standby and the group may be set to passive mode. The high priority requests 402, 404, 406, 408 and 410 may be removed successively and the individual requests 210, 212, 216, 222 and 224 may be restored. Finally, the situation depicted in FIG. 2 may be restored. The relationships may be obeyed, so that first the resource 'NFS Server' 220 may be started, followed by starting the resource 'DB2' 218 and finally starting the resource 'Application1' 206. Note, that resource 'Application2' 208 is not started, because the original request that was restored is an offline request.

In a particular embodiment, the observed state of the first resource 206 may be set in the passive mode. When the observed state of the second resource 204 has changed, the observed state of the first resource 206 may be set by propagating the observed state from the second resource 204 to the first resource 206 when the first resource 206 is a resource reference. Further, the observed state of the second resource 204 may be set to online when the second resource 204 is a resource group with all members 218 and 220 of the group in the observed state online. Further, the observed state of the second resource 204 may be set to offline when the second resource 204 is a resource group with all members 218 and 220 of the group being in the observed state offline.

The observed state of the second resource 204 may be set to "not applicable" when the second resource 204 is a resource group with the members 218 and 220 of the group being in mixed observed states. The observed state of a resource may be set to online when the resource is a choice group with all alternatives of the group being in the observed state offline and the preferred member of the group being in an observed state online. The observed state of a resource may be set to offline when the resource is a choice group with all alternatives and all members of the group being in the observed state offline. The observed state of a resource is set to "not applicable" when the resource is a choice group with an alternative of the group being in the observed state online.

The observed state "not applicable" is a state identifying a resource in passive mode that has no automation goal. There may be values of the observed state that reflect the automation goal, such as the values of starting and stopping. When the desired state of a group is online and the observed states of members are partially 'online' and partially 'offline', the observed state of the group is starting, because the group currently tries to start the resources that are not observed online yet. When the desired state of a group is 'offline,' and the observed states of members are partially online and partially offline, the observed state of the group is 'stopping,' because the group currently tries to stop the resources that are not observed offline yet.

An advantage of the observed state value 'not applicable' and the algorithm for setting this value is that the observed state provides consistent information for resources whose desired state is standby.

In a particular embodiment, a compound state of the first resource 206 is set into a passive mode, and when the compound state of the second resource 204 has changed, the compound state of the first resource 206 is set by propagating the compound state from the second resource 204 to the first resource 206 when the first resource 206 is a resource reference. The compound state of second resource 204 is set to a worst compound state of all direct downstream resources that are group members when the second resource 204 is a resource group. The compound state of a choice group resource is set by checking if the observed states of all alternatives are offline and, when this constraint is satisfied, propagating the compound state from the preferred member to the resource when the resource is a choice group.

The compound state of resources can have the values 'OK', 'warning', 'error', and 'fatal'. OK means that the resource is working as desired. Warning means that the resource is in warning state. Error indicates that a resource is in an error state. Fatal indicates that the resource has encountered an unrecoverable error. Fatal is worse than error, error is worse than warning, and warning is worse than OK.

In another particular embodiment, when a resource is a choice group, the compound state of the resource may be set by checking if the observed states of all alternatives are offline and when this constraint is satisfied, by propagating the compound state from a preferred member to the resource, or, when the constraint is not satisfied, by setting the compound state to error.

When the desired state of the second resource 204 is online or offline, during a starting or stopping procedure the group members 218 and 220 of the resource may be in a mixed online or offline state. In this case, the observed state of the second resource 204 is starting or stopping, which may be a transient state depending on the context of the desired state. However, when the observed state of the members is mixed and when the desired state is standby, i.e., the second resource is in passive mode, there is no automation direction. Thus, the observed state is "not applicable."

The observed state and the compound state may be computed in the context of the desired state. The compound state reflects whether the observed state corresponds to the desired state, i.e. the resource works as desired. Introducing the above mentioned computational semantics for determining the observed state and the compound state of a resource solves the problem that in passive mode no actual automation goal exists for the resource. Nevertheless, in order to determine whether a problem has occurred, it may be still helpful to provide a compound state even in the passive mode which thus enables a "monitoring ability" of the resource.

The default desired state for the first resource 206 is set to 'standby' in the policy and the policy is activated. The default desired state value 'standby' indicates that during activation of the policy the first resource 206 may be kept free of any initial default requests from the automation engine and may be thus initially in passive mode.

Figure 5:
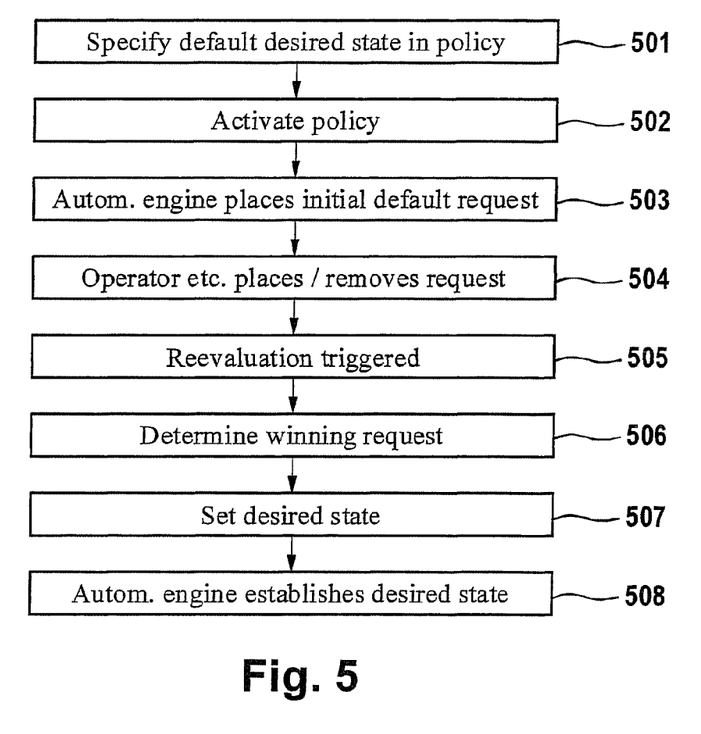
FIG. 5 is a flow chart of an illustrative embodiment of determining a desired state in a request or goal-based system automation engine.

FIG. 5 is a flow chart of an illustrative embodiment of determining a desired state in a request or goal-based system automation engine. When a policy is defined that describes the resources of the IT infrastructure that should be automated, a default desired state may be specified for every resource 501. When the policy is activated 502, the automation engine submits an initial default request with low priority on every resource whose default desired state may be other than standby 503. When the default desired state is online, an online request with low priority may be submitted for the resource. When the default desired state is offline, an offline request with low priority may be submitted for the resource. When the default desired state is standby, no request may be submitted for the resource. After a policy is activated, requests of multiple sources may be submitted for or removed from the resources 504. Requests may have various sources, for example the automation engine, different operators or external scripts. There can be at most one request placed on a resource from each source. When, for example an operator submits a request for a resource on which he has already submitted a previous request, the prior request may be overwritten by the later one.

The previously described steps 501-504 imply that at any point in time, a set of any number of requests may be placed on a resource, including the case that no request may be placed on the resource. When the default desired state of a resource is standby, there can be zero, one or multiple requests placed on the resource.

There may be various causes that trigger a new automation cycle like receiving an event, or when a request has been submitted or removed. As part of processing an automation cycle, a reevaluation of a resource may be triggered 505. Reevaluation of a resource means that the automation engine determines the current values for the various states, including the desired state which may be the actual automation goal for the resource in this evaluation cycle. This may be done by first determining the winning request 506 which may be the one request of a set of competing requests placed on the resource that has the highest priority. When there are multiple requests with high priority, the request from the highest prioritized source may be selected. Then the desired state of the resource may be set according to the requested action that may be specified in the winning request 507.

Once the desired state of a resource is determined and set, the automation engine takes appropriate action to establish the desired state of the resource in order to fulfill the determined automation goal for the resource 508. For example, the automation engine will pass requests down to the referenced resources defined in the first level automation clusters. Note that once the desired state of a resource is determined and set, the set of requests which may be placed on the resource may be no longer required for processing the evaluation cycle.

FIG. 6 is a flow chart of an illustrative embodiment of determining an action performed on a downstream resource to establish a desired state of the downstream resource in a request or goal-based system automation engine. The action that may be taken by the automation engine to achieve the desired state as the final step of a reevaluation cycle 508 in FIG. 5, is depicted in more detail in the flowchart of FIG. 6. First the relationship between the first resource and the second resource is evaluated 601. When the relationship type is 'HasAlternative', a first resource may be a choice group and a second resource may be an alternative in this choice group. An important constraint of a choice group is that at most one resource, the preferred member, may be online. A choice group has to ensure that all alternatives are kept offline, regardless of whether the choice group is running in active mode or passive mode. Thus, the automation engine submits an offline request with high priority on any choice group alternative 602.

When the relationship type between a first resource and a second resource is 'Reference' or 'HasMember', the action taken by the automation engine may be independent of the resource type and the relationship type, as the following consideration shows. When the relationship type between the first resource and the second resource is 'Reference', the first resource may be a resource reference and the second resource may be a referenced resource defined in a first level automation cluster. The goal of the automation engine may be that the desired state of the first resource is reflected in a request that is placed on the second resource. When the relationship type is 'HasMember', either the resource type of the first resource is a resource group and the second resource is a member of this resource group, or the resource type of the first resource is a choice group and the second resource is the preferred member of the choice group. The strategy of the automation engine may be that the desired state of the first resource may be reflected in a request that may be placed on the second resource. Thus, the proper action that may be taken by the automation engine on the second resource may be independent of the actual resource types and relationship type.

To determine the action, the desired state of the first resource is evaluated 603. When the desired state of the first resource is standby, the resource, regardless of the first resource's type and the relationship type, goes into passive mode. Because a resource in passive mode does not influence downstream resources, the automation engine has to ensure that no request is submitted from the first resource for the second resource 605. Such a request might be submitted in the previous evaluation cycle where the resource was in active mode. The requests that are submitted by resources for downstream resources contain information about the entry that submitted the requests. Based on this information, the request with the entry corresponding to the first resource can be detected and removed from the second resource.

When the desired state of the first resource is online or offline, the resource, regardless of the first resource's resource type and the relationship type, goes into active mode. The automation engine takes action to establish the desired state by submitting proper requests on the downstream resources. In order to achieve the desired state of the first resource, the automation engine submits a copy of the first resource's winning request for the second resource 604.

A default desired state may be required that specifies the default request for a resource. By setting the default desired state value to standby, an activation of a policy can be performed without the need to initially submit a request for the first resource. In other words, by setting the default desired state value to standby, a policy can be activated that contains a first resource which may be initially in passive mode.

When the default desired state is standby, there may be no request placed on a resource. Thus, the desired state can be standby. For example, when a group with a desired state of standby is placed in another group with a desired state of standby, both may be in passive mode. When a request is placed on the inner group, the inner group's desired state changes. The inner group goes into active mode, but the outer group is not affected. When a request is placed on the outer group, the outer group's desired state changes, the outer group's mode switches to active and the outer group places a request for the inner group which in turn also switches to active mode.

A relationship may indicate that a first resource is a resource group and a second resource is a member of the group. A request with higher priority than any of the requests that may be placed for resources connected directly or indirectly via relationships to the first resource is submitted for the first resource. Requests can be prioritized by priority low<high<force and by source 'workload scheduler'<automation<operator. The workload scheduler may for example be a script. Automation describes the end-to-end automation manager and operator describes a human user operating the system automation.

Methods described herein simplify the task of temporarily applying or removing a common automation goal to or from a subset of resources. Groups typically propagate a request to their members. Temporarily applying or removing a common automation goal to or from a subset of resources used to require lengthy scripts that individually switch, submit, or remove requests on the individual resources one after the other, resulting in a rather lengthy, time consuming method of switching automation goals.

A subset of the resources being managed can be defined by only one request placed on a first resource that can be synchronized with a common automation goal. Thus, the group concept enables a dynamic switch between passive mode and active mode at runtime.

As an example, when the second resource 204 is a resource group or a choice group including a set of members 218 and 220 running in passive mode, a method includes switching from passive mode to active mode by submitting a request for the second resource 204. This enables one to apply a common automation goal even on a large set of members comprised in the second resource by a single atomic command, with extremely low administrative effort. Scripts are not required and a time delay and inconsistencies due to a sequential execution of script commands may be avoided.

The embodiments described herein are useful in disaster recovery where a site takeover needs to be performed as fast as possible. By using the methods described herein, the site takeover can be triggered by simply placing a single offline request on a resource which in turn switches to active mode and submits offline requests for the members of the resource. Thus, at runtime the behavior mode of a group policy can be switched dynamically between active and passive, enabling temporary synchronizing of automation goals of subsets of resources, while nevertheless preserving and restoring the individual members' automation goals.

In a particular embodiment, a computer system includes a policy-based automation engine to dynamically set the automation behavior of a first resource in a request-driven system automation. In another particular embodiment, a computer program product includes a storage medium on which is stored computer executable instructions to perform methods described herein.

Figure 7:
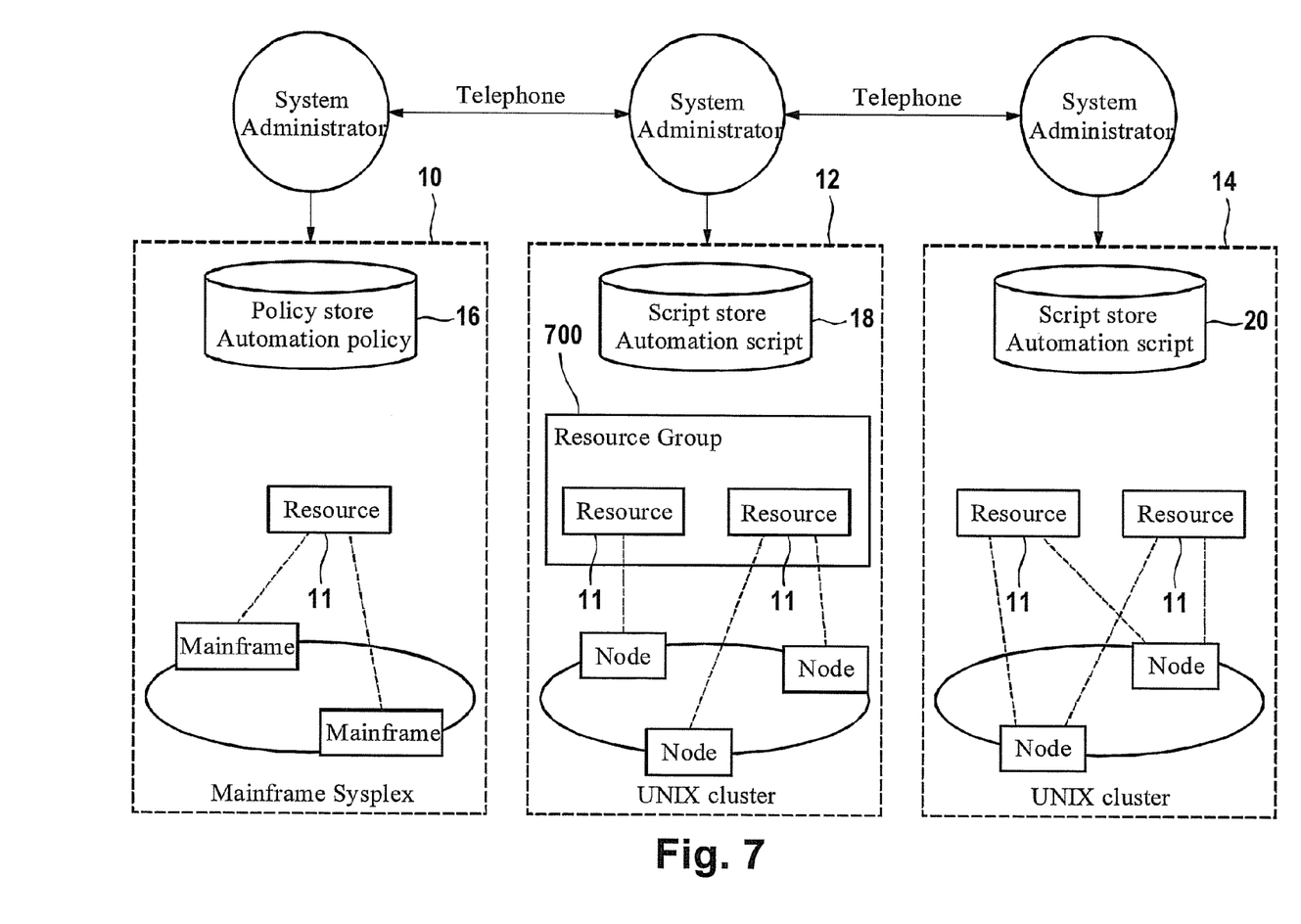
FIG. 7 is is an illustrative embodiment of an environment having resources with interdependencies between each other and hosted on different clusters and platforms.

FIG. 7 is an illustrative embodiment of an environment having resources with interdependencies between each other and hosted on different clusters and platforms. FIG. 7 illustrates a schematic system view of an example IT-infrastructure that uses system automation to ensure high-availability for its applications. An enterprise may be assumed to have an IT-infrastructure comprising a mainframe sysplex (e.g. a IBM-zSeries sysplex) 10 and two further UNIX clusters 12 and 14. In this example, mainframe automation is based on an automation policy stored in a policy store 16. The automation of the UNIX clusters 12, 14 may be based on automation scripts stored in respective script stores 18, 20.

Enterprise-level reconfigurations including diverse platforms—e.g. mainframe 10, UNIX 12, 14, or WINDOWS—are planned operations. They are typically performed by human operators depicted in the upper part of FIG. 7. Often, multiple operators work together if their skill is platform-specific and different platforms are involved. In sophisticated IT enterprises, the human operator can not foresee what a consistent configuration will be, what other configurations can be selected alternatively, and under what conditions an alternative can be selected. Enterprise-level reconfigurations of resources 11 takes much time since configuration work must be agreed upon, often by long distance telephone calls, between the respective system administrators before it is performed.

Figure 8:
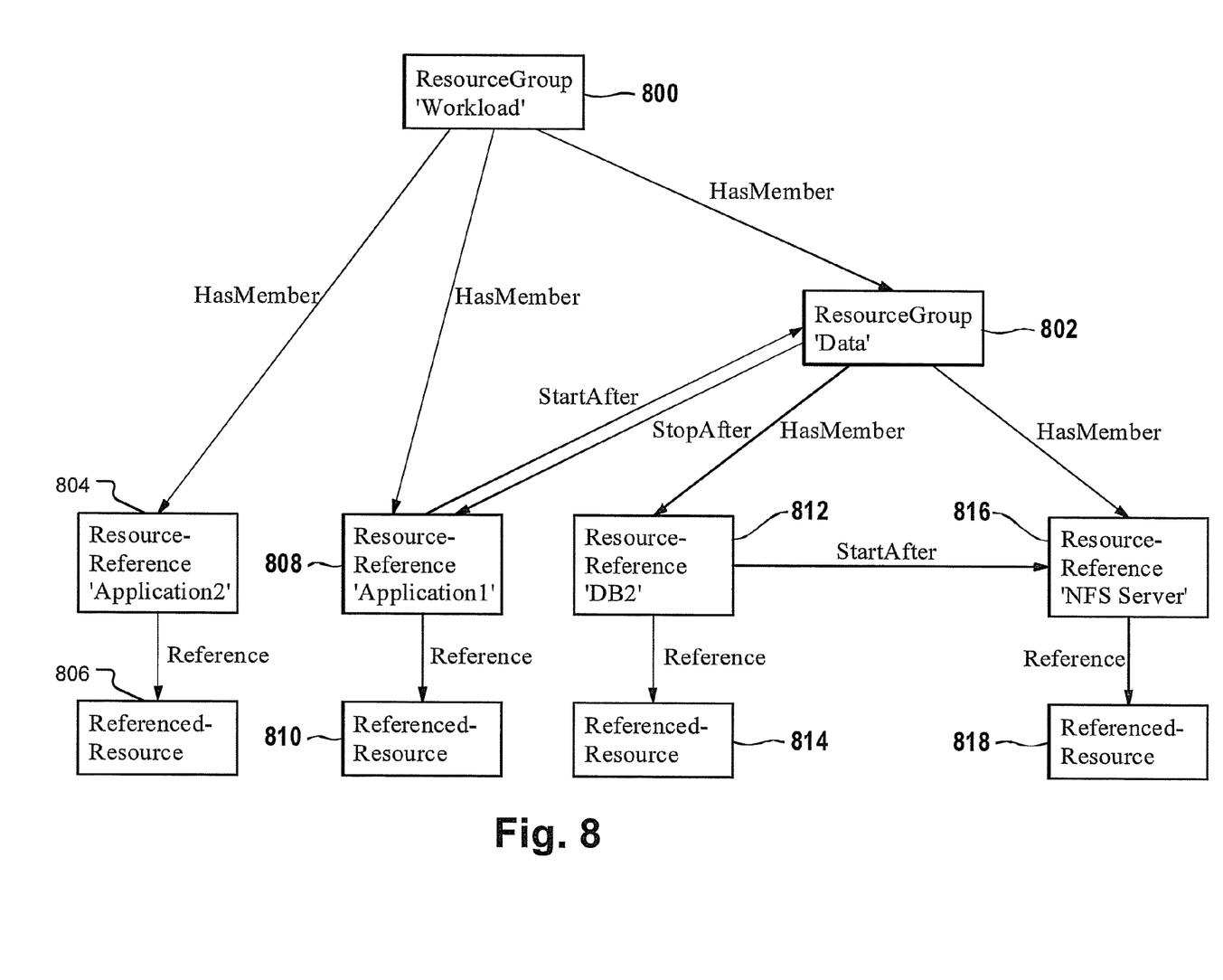
FIG. 8 is an illustrative embodiment of dynamically setting the automation behavior of a resource via a policy-based automation engine.

FIG. 8 is an illustrative embodiment of dynamically setting the automation behavior of a resource via a policy-based automation engine. FIG. 8 is an alternative visualization of the policy that is depicted in FIGS. 2-4. FIG. 8 shows that the group concept may be realized via relationships such that a resource group is a resource that has relationships to the members of the resource group. The resource group 'Workload' 200, 800 has three HasMember relationships to the resource references 'Application1' 206, 808 and 'Application2' 208, 804 as well as to the resource group 'Data' 204, 802. The resource group 'Data' 204, 802 has two HasMember relationships to the resource references 'DB2' 218, 812 and 'NFS Server' 200, 816. The two StartAfter relationships and the StopAfter relationship are also depicted in the resource graph of FIG. 8. Further, the implementation of resource references may be visualized by four Reference relationships that point from the resource references 804, 808, 812 and 816 to the corresponding referenced resources 806, 810, 814 and 818 which may be defined in the first level automation clusters. For completeness, the relationships of a choice group, which is not part of the depicted policy, are also mentioned here. A choice group is a resource that has exactly one HasMember relationship to the preferred member and HasAlternative relationships to the alternatives.

Figure 9:
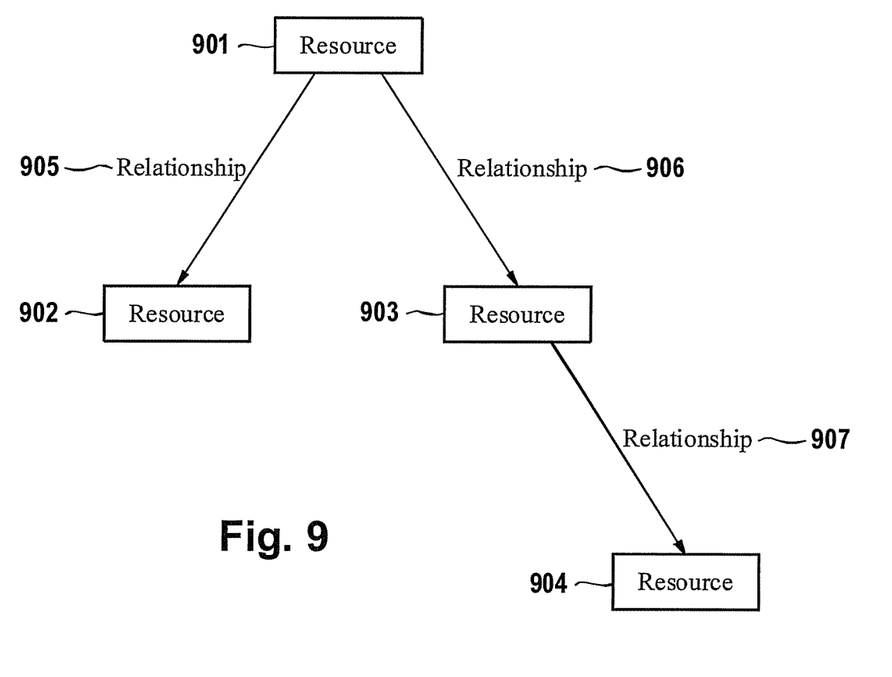
FIG. 9 is a block diagram of an illustrative embodiment of using relationships to model dependencies between resources.

FIG. 9 is a block diagram of an illustrative embodiment of using relationships to model dependencies between resources. FIG. 9 shows the general model of resources and relationships for system automation. Resources may be associated via relationships with each other. Relationships indicate a type of automation dependency. While relationships like HasMember or HasAlternative may be part of the grouping concept, relationships like StartAfter or StopAfter further constrain the automation behavior. Shown in FIG. 9 is a resource 901 that has a relationship 905 to a resource 902 and a relationship 906 to a resource 903. The resources 902 and 903 may be directly associated with the resource 901 while the resource 904 may be indirectly associated with the resource 901 by the relationship 907 to resource 903.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks of the Figures.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope of the disclosure. The embodiment was chosen and described in order to best explain the principles of the disclosure and the practical application, and to enable others of ordinary skill in the art to understand the invention for various embodiments with various modifications as are suited to the particular use contemplated.

What is claimed is:

1. A method, comprising:
    receiving, at a policy based automation engine of a computing system, a first request that specifies a first desired state of a first computing resource of a plurality of computing resources, wherein the first desired state is one of online, offline, and standby;
    placing the first computing resource into the first desired state;
    when the first desired state is one of online and offline:
        when the first computing resource is in a passive behavioral mode, placing the first computing resource into an active behavioral mode, wherein a second computing resource of the plurality of computing resources has a relationship to the first computing resource, wherein a desired state of the second computing resource is a second desired state, and wherein the second desired state is one of online, offline, and standby; and
        submitting a second request from the first computing resource to the second computing resource, the second request specifying that the desired state of the second computing resource is the first desired state; and
    when the first desired state is standby and when the first computing resource is in the active behavioral mode:
        placing the first computing resource into the passive behavioral mode;
        removing one or more prior requests submitted from the first computing resource to the second computing resource; and
        restoring the desired state of the second computing resource to the second desired state.

2. The method of claim 1, wherein the first computing resource is an application.

3. The method of claim 2, wherein the application is a database.

4. The method of claim 1, wherein the first computing resource and the second computing resource have different automation goals when the first computing resource is in the passive behavioral mode.

5. The method of claim 1, wherein an error state is associated with the first computing resource when an observed state of the first computing resource is different from the first desired state of the first computing resource and when the first computing resource is not in a transient state.

6. The method of claim 1, further comprising performing a site takeover by:
    receiving a third request that specifies that a desired state of the first computing resource is offline, wherein the third request has a force priority;
    when the first computing resource is in the passive behavioral mode, placing the first computing resource into the active behavioral mode;
    placing the first computing resource into an offline state;
    submitting a fourth request from the first computing resource to the second computing resource, the fourth request specifying that the desired state of the second computing resource is the offline state, wherein the fourth request has the force priority; and
    submitting a fifth request from the first computing resource to a third computing resource, the fifth request specifying that a desired state of the third computing resource is an online state of the third computing resource.

7. The method of claim 1, wherein:
    when the first computing resource is in the passive behavioral mode, a compound state of the first computing resource is based on compound states of members of the first computing resource, and
    when the first computing resource is in the active behavioral mode, the compound state of the first computing resource is based exclusively on the first desired state and an observed state of the first computing resource.

8. A system, comprising:
    a memory; and
    a processor to:
        place a first resource into a first state, wherein the first state is one of an online state, an offline state, and a standby state;
        when the first state is one of the online state and the offline state:
            when the first resource is in a passive mode,
                assign an active mode to the first resource, wherein a second resource has a relationship to the first resource, wherein a desired state of the second resource is a second desired state, and wherein the second desired state is one of the online state, the offline state, and a standby state; and
                store the second desired state; and
            submit a second request from the first resource to the second resource, the second request specifying that the desired state of the second resource is the first state; and
        when the first state is a standby state and when the first resource is in the active mode:
            assign the passive mode to the first resource;
            revoke one or more prior requests submitted from the first resource to the second resource; and
            set the desired state of the second resource to the second desired state.

9. The system of claim 8, wherein the first resource and the second resource have different automation goals when the first resource is in the passive mode.

10. The system of claim 8, further comprising placing the second resource into one of the online state and the offline state when the first resource is in the passive mode.

11. The system of claim 8, further comprising switching the first resource between the active mode and the passive mode dynamically while the processor is in run time.

12. The system of claim 8, further comprising switching the first resource from the passive mode to the active mode in response to receiving a request for the first resource.

13. A non-transitory computer readable storage medium comprising instructions that, when executed by a processor, cause the processor to:
place a first computing resource into a first desired state, wherein the first desired state is one of online, offline, and standby;
when the first desired state is one of online and offline:
when the first computing resource is in a passive mode, place the first computing resource in an active mode, wherein a second computing resource has a relationship to the first computing resource, and wherein a desired state of the second computing resource is a second desired state, wherein the second desired state is one of an online state, an offline state, and a standby state; and
submit a request from the first computing resource to the second computing resource, the request specifies that the desired state of the second computing resource is the first desired state; and
when the first desired state is standby and when the first computing resource is in the active mode:
place the first computing resource in the passive mode;
remove one or more prior requests submitted from the first computing resource to the second computing resource; and
restore the desired state of the second computing resource to the second desired state.

14. The non-transitory computer readable storage medium of claim 13, further comprising placing the second computing resource into the online state or the offline state when the first computing resource is in the passive mode.

15. The method of claim 7, wherein:
when the first computing resource is a resource group:
the observed state of the first computing resource is online when observed states of all of the members of the first computing resource are online;
the observed state of the first computing resource is offline when the observed states of all of the members of the first computing resource are offline; and
the observed state of the first computing resource is not applicable when an observed state of at least a first member of the first computing resource is online and an observed state of at least a second member of the first computing resource is offline; and
when the first computing resource is a choice group:
the observed state of the first computing resource is online when an observed state of a preferred member of the first computing resource is online and observed states of all alternative members of the first computing resource are offline;
the observed state of the first computing resource is offline when the observed state of the preferred member of the first computing resource is offline and the observed states of all of the alternative members of the first computing resource are offline; and
the observed state of the first computing resource is not applicable when the observed state of at least one of the alternative members of the first computing resource is online.

16. The method of claim 1, wherein a warning state is associated with the first computing resource when an observed state of the first computing resource is different from the first desired state of the first computing resource and when the first computing resource is in a transient state.

17. The method of claim 1, wherein:
the first request has a highest request priority of a plurality of requests, and
when each request in a subset of the plurality of requests has the highest request priority, a source of the first request has a highest source priority of a plurality of sources corresponding to the subset of the plurality of requests.

* * * * *